Aug. 24, 1926.
1,597,465
W. J. HEPPERLE
CARRIER SEPARATING DEVICE
Filed March 24, 1922
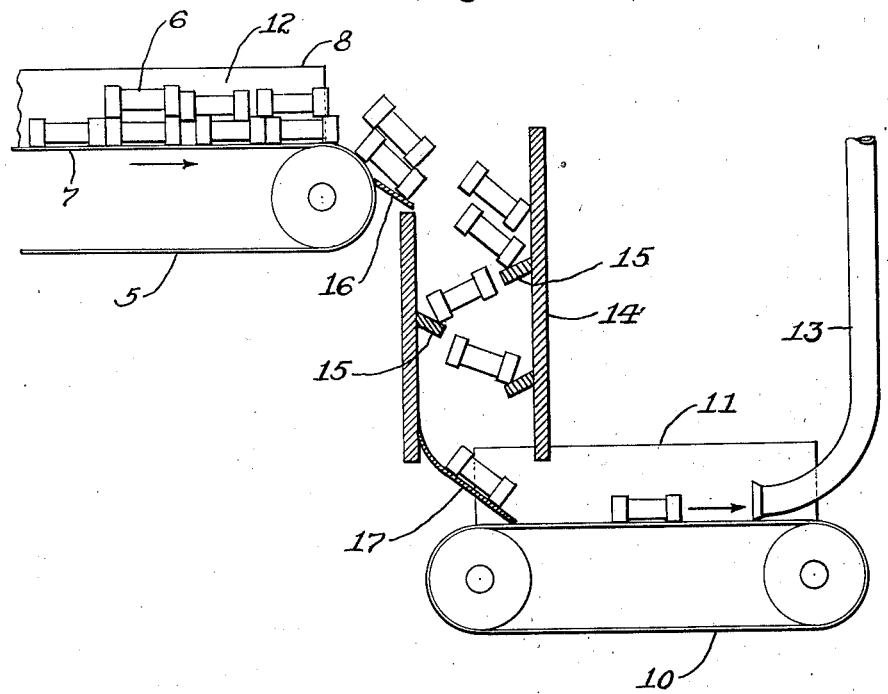
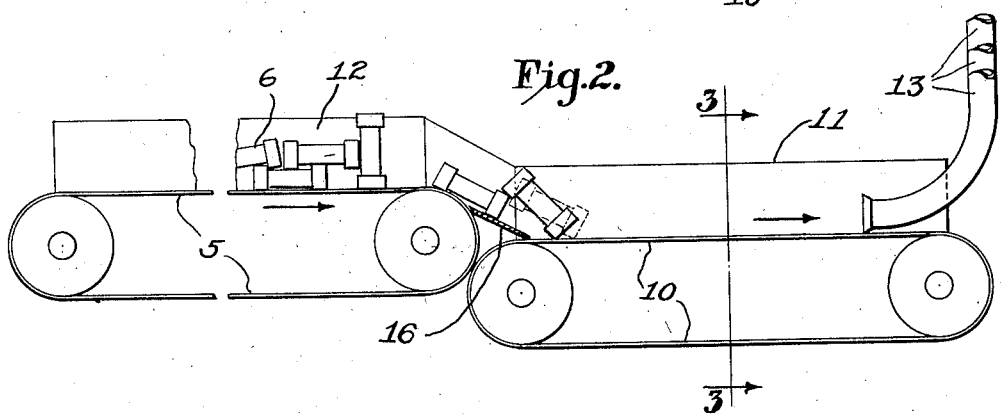
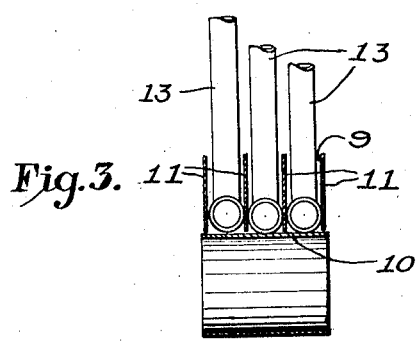
INVENTOR.
WILLIAM J. HEPPERLE
BY
ATTORNEY.

Patented Aug. 24, 1926.

1,597,465

UNITED STATES PATENT OFFICE.

WILLIAM J. HEPPERLE, OF BLOOMFIELD, NEW JERSEY, ASSIGNOR TO THE LAMSON COMPANY, OF SYRACUSE, NEW YORK, A CORPORATION OF MASSACHUSETTS.

CARRIER-SEPARATING DEVICE.

Application filed March 24, 1922. Serial No. 546,334.

This invention relates generally to devices for spacing apart traveling objects.

The invention is particularly applicable for use in carrier despatch systems in which conveyor belts are employed for transporting the carriers from place to place at a central distributing station. One of the objects of the invention is to provide means for correcting a condition in which carriers may take an overlapping and interposed relative arrangement that interferes with their subsequent treatment and tends to produce a clogged or jammed condition of the apparatus.

The invention includes the use of a conveyor belt section traveling at a higher speed than that of the main conveyor belt and so related to the main belt that as each carrier is received by the belt section the carrier is withdrawn from contact with any other carriers with which it may have been grouped.

Preferably the separating action is facilitated by causing the carriers to travel in paths or ways of such narrowness that a plurality of carriers cannot travel therein, in a side-by-side or an abreast relation.

In the drawings in which two preferred forms of the invention have been selected for illustration, Figure 1 is a view in side elevation and partly in section of a portion of a carrier conveying system embodying a form of the invention.

Figure 2 is a view similar to Figure 1 showing a modified form of the invention.

Figure 3 is a view in vertical cross-section taken at the line 3—3 of Figure 2.

Referring to the drawings for a more detailed description of the invention, a main conveyor belt 5 is adapted to convey carriers 6 on its upper ply or stretch 7 and is preferably provided with vertical partition members 8 which serve to provide a plurality of paths or ways of such width that two carriers cannot travel in an abreast relation therein.

In Figure 1 of the drawing a conveyor belt section 10 is arranged to travel at a higher speed than the speed of travel of the main conveyor belt 5 and is also provided with way-forming partition members 11.

The conveyor belt section 10 is arranged to receive carriers 6 from the adjacent delivery end of the main conveyor 5 on which the carriers may have been aggregated in groupings involving an overlapping or superposed relation of the individual carriers as indicated at 12 in Figures 1 and 2. In order to overcome the overlapping arrangement of the carriers and to cause them to be conveyed in individually separated order for delivery to the receiving pneumatic despatch tubes 13 or for any other purpose, a transfer device 14 is made use of in Figure 1 for receiving carriers from the main conveyor 5 and depositing them in separated or spaced apart relation on the conveyor belt section 10. The transfer device 14 is in the nature of a vertical chute provided with inwardly and downwardly extending baffle members 15 which act to cause the carriers passing therethrough to tumble from side to side of the chute and to finally emerge therefrom in relatively separated order. The separating action is increased by the belt section 10 which by reason of its relatively high speed of operation acts to quickly pull each arriving carrier away from the following carriers and thereby produce the desired separation. A conveniently arranged slide member 16 assists in directing the carriers into the chute and a corresponding slide member 17 at the foot of the chute directs carriers from the chute and into engagement with the conveying surface of the belt section 10.

In what may be called a preferred form of the invention there is shown in Figure 2 of the drawings a belt conveyor 5 similar to that shown in Figure 1 and a carrier separating belt section 10 which is placed to receive carriers directly from the main conveyor without the interposition of a separating chute 14. I find that advantageous results can be received by causing the belt section 10 to operate at a speed sufficiently high to ensure the withdrawal of each carrier as it is received from the next following carrier.

It will be clear that the receiving bell mouths 18 of the pneumatic tubes 13 may be arranged in the ways 9 to receive the separated carriers and transmit the carriers to their destinations.

What I claim is:

1. In a separating device for moving articles, a main conveyor belt for moving articles at a certain rate of speed, a chute for receiving articles from the belt, said chute being constructed to cause the articles to be tumbled from side to side of the chute to thereby perform a separating action on the articles, and a conveyor belt moving at a higher sped than the main conveyor belt for receiving articles from the chute.

2. Apparatus for separating pneumatic despatch carriers comprising a plurality of parallel guides spaced to define ways substantially equal in width to the maximum diameter of a carrier, means for moving carriers along said ways at a predetermined speed, a second set of guides providing ways respectively forming continuations of the ways of the first set but disposed at a lower level, means for moving carriers along the ways of the second set at a predetermined speed greater than that of carriers moving along the upper ways, and fixed inclined guide means engageable by carriers discharged from the upper ways for directing them by gravity toward the lower ways.

3. Apparatus for separating pneumatic despatch carriers comprising a plurality of parallel guides spaced to define ways substantially equal in width to the maximum diameter of a carrier, means for moving carriers horizontally along said ways at a predetermined speed, a second set of guides providing ways respectively forming continuations of the ways of the first set but disposed at a lower level, means for moving carriers horizontally along the ways of the second set at a predetermined speed greater than that of carriers moving along the upper ways, fixed inclined guide means receiving carriers from the upper ways and delivering them by gravity to the lower ways, and a pneumatic tube corresponding to each of the ways of the lower set, said tubes having curved receiving terminals disposed within the respective ways, said terminals having open ends to receive carriers approaching along said ways.

4. Apparatus for separating pneumatic despatch carriers comprising a plurality of parallel guides spaced to define ways substantially equal in width to the maximum diameter of a carrier, means for moving carriers along said ways at a predetermined speed, a second set of guides providing ways respectively forming continuations of the ways of the first set but disposed at a lower level, means for moving carriers along the ways of the second set at a predetermined speed greater than that of carriers moving along the upper ways, and a chute for receiving carriers from the upper ways and guiding them toward the lower ways, and baffle members engageable with carriers moving down the chute for tumbling them from side to side thereby to perform a separating action.

5. Apparatus for separating pneumatic despatch carriers comprising a plurality of parallel guides spaced to define ways substantially equal in width to the maximum diameter of a carrier, means for moving carriers along said ways at a predetermined speed, a second set of guides providing ways respectively forming continuations of the ways of the first set but disposed at a lower level, means for moving carriers along the ways of the second set at a predetermined speed greater than that of carriers moving along the upper ways, a chute for receiving carriers from the upper ways, baffle members projecting inwardly in staggered relation from the inner surface of the chute and adapted to tumble the carriers from side to side as they fall and thereby to perform a separating action, and an inclined guide for delivering carriers from the lower end of the chute to the lower ways.

WILLIAM J. HEPPERLE.